(12) United States Patent
Bannister et al.

(10) Patent No.: US 7,369,766 B2
(45) Date of Patent: May 6, 2008

(54) OPTICALLY BOOSTED ROUTER

(75) Inventors: Joseph A. Bannister, Palos Verdes Estates, CA (US); Joseph D. Touch, Manhattan Beach, CA (US); Purushotham Kamath, San Jose, CA (US); Aatash Patel, Iselin, NJ (US); John E. McGeehan, Washington, DC (US); Alan E. Willner, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 871 days.

(21) Appl. No.: 10/298,236

(22) Filed: Nov. 15, 2002

(65) Prior Publication Data
US 2004/0022539 A1 Feb. 5, 2004

Related U.S. Application Data

(60) Provisional application No. 60/334,673, filed on Nov. 15, 2001.

(51) Int. Cl.
*H04B 10/00* (2006.01)
(52) U.S. Cl. .......................... 398/51; 398/57
(58) Field of Classification Search ................ 370/218, 370/351–356, 401–403; 398/45–57
See application file for complete search history.

(56) References Cited

U.S. PATENT DOCUMENTS 5,920,566 A * 7/1999 Hendel et al. ............... 370/401
6,397,260 B1 * 5/2002 Wils et al. .................. 709/238
6,512,612 B1 * 1/2003 Fatehi et al. ................. 398/49
6,647,208 B1 * 11/2003 Kirby .......................... 398/45
2001/0028651 A1 10/2001 Murase

FOREIGN PATENT DOCUMENTS

| EP | 1 073 306 A2 | 1/2001 |
|---|---|---|
| WO | WO 99/53653 | 10/1999 |
| WO | WO 00/44139 | 7/2000 |
| WO | WO 01/39413 A2 | 5/2001 |

OTHER PUBLICATIONS

PCT International Search Report, May 16, 2003.
Yao, S. and Mukherjee, B., "Advances in Photonic Packet Switching: An Overview," Feb. 2000, IEEE Communications Magazine.
Ghani, N. "Lambda-Labeling: A Framework for IP-Over-WDM Using MPLS," Apr. 2000, Optical Networks Magazine.

(Continued)

*Primary Examiner*—Agustin Bello
(74) *Attorney, Agent, or Firm*—Fish & Richardson P.C.

(57) ABSTRACT

Systems and techniques to optically boost a router. In general, in one implementation, the technique includes: receiving an optical signal defining a packet of data, initiating electronic routing of the optical packet, and initiating optical routing of the optical packet. The optical routing involves determining forwarding information based on a routing field in the optical packet, and if optical forwarding is available, terminating the electronic routing of the packet before completion of the electronic routing, and forwarding the optical signal, which defines the packet, based on the determined forwarding information.

17 Claims, 5 Drawing Sheets

OTHER PUBLICATIONS

Y. Rekhter, B. Davie, D. Katz, E. Rosen,G. Swallow, "Cisco Systems' Tag Switching Architecture Overview," IETF RFC 2105, Feb. 1997.

P. Newman, G. Minshall, T. Lyon, "IP Switching—ATM Under IP," IEEE/ACM Trans. Networking, vol. 6, No. 2, pp. 117-129, Apr. 1998.

D. Blumenthal, A. Carena, L. Rau, V. Curri, and S. Humphries, "WDM Optical IP Tag Switching with Packet-Rate Wavelength Conversion and Subcarrier Multiplexed Addressing," Technical Digest of the Optical Fiber Communication Conference (OFC '99), San Diego, CA, Session THM1, pp. 162-164, Feb. 21-26, 1999.

J. Bannister, J. Touch, A. Willner, and S. Suryaputra, "How Many Wavelengths Do We Really Need? A Study of the Performance Limits of Packet Over Wavelengths," Optical Networks, Apr. 2000, pp. 17-28 and also SPIE/Baltzer Optical Networks, vol. 1, No. 2, pp. 1-12, Feb. 2000.

E. Rosen, A. Viswanathan, and R. Callon, "Multiprotocol Label Switching Architecture," IETF RFC 3031, Jan. 2001.

D. Awduche, Y. Rekhter, J. Drake, and R. Coltun, "Multi-Protocol Lambda Switching: Combining MPLS Traffic Engineering Control with Optical Crossconnects," IETF Internet Draft, Mar. 2001.

S. Suryaputra, J. Touch, and J. Bannister "Simple Wavelength Assignment Protocol," Proc. SPIE Photonics East 2000, vol. 4213, pp. 220-233, Boston, Oct. 1999.

J. Turner, "Terabit Burst Switching," Tech. Rep. WUCS-9817, Washington Univ., Dept. of Comp. Sci., Jul. 1998.

C. Qiao and M. Yoo, "Optical Burst Switching—A New Paradigm for an Optical Internet," J. High Speed Networks, vol. 8, No. 1, pp. 69-84, 1999.

M. Degernark, A. Brodnik, S. Carlsson, S.Pink., "Small Forwarding Tables for Fast Routing Lookups," Proc. ACM Sigcomm '97, pp. 3-14, Cannes, Sep. 1997.

M. Waldvogel, G. Varghese, J.Turner, B. Plattner, "Scalable High Speed IP Lookups," Proc. ACM Sigcomm '97, pp. 25-36, Cannes, Sep. 1997.

P. Gupta, S. Lin, and N. McKeown, "Routing Lookups in Hardware at Memory Access Speeds," Proc. IEEE INFOCOM '98, pp. 1240-1247, San Francisco, Apr. 1998.

B.Lampson, V. Srinivasan, and G. Varghese, "IP Lookup Using Multiway and Multicolumn Binary Search," IEEE INFOCOM '98, pp. 1248-1256, San Francisco, Aug. 1997.

"AS1221 BGP Table Data," http://www.telstra.net/ops/bgp/bgp-active.html, Aug. 2000.

J. Bannister, J. Touch, P.Kamath, A.Patel, "An Optical Booster for Internet Routers," Proceedings of the 8th International Conference on High Performance Computing, Hyderabad, India, Dec. 2001.

D. Feldmeier, "Improving gateway performance with a routing table cache," Proceedings of IEEE Infocom, pp. 298-307, New Orleans, Mar. 1988.

B. Talbot, T. Sherwood, and B. Lin, "IP Caching for Terabit Speed Routers," Proc. IEEE GlobeCom '99, pp. 1565-1569, Rio de Janeiro, Dec. 1999.

M. Karol, M. Hluchyj, S. Morgan, "Input Versus Output Queueing on a Space Division Switch Packet Switch," IEEE Transactions on Communications, vol. 35, No. 12, pp. 1347-1356, Dec. 1987.

"Apex Integrated Content Addressable Memory," Altera Apex Data Sheet, Available on the Altera web site: http://www.altera.com, 1999.

G. Iannaccone, C. Diot, N.McKeown, "Monitoring very high speed links," Proceedings of the ACM Sigcomm Internet Measurement Workshop, San Francisco, Nov. 2001.

P. Kamath, K. C. Lan, J. Heidemann, J. Touch, J. Bannister, "Generation of High Bandwidth Network Traffic Traces," to appear, Proceedings of the 10th IEEE/ACM International Symposium on Modeling, Analysis and Simulation of Computer and Telecommunication Systems, Fort Worth, Texas, Oct. 2002.

"Auckland Internet Packet Traces," http://moat.nlanr.net/Traces/Kiwitraces/auck2.html, Jan. 2001.

J.C.R. Bennett, C. Partridge and N. Shectman, "Packet reordering is not pathological network behavior," IEEE/ ACM Transactions on Networking, vol. 7, No. 6, Dec. 1999, pp. 789-798.

S. Lin, N. McKeown, "A Simulation Study of IP Switching," Proceedings of ACM Sigcomm '97, pp. 15-24, Cannes, Sep. 1997.

M. Cardakli, S. Lee, A. E. Willner, V. Grubsky, D. S. Starodubov, and J. Feinberg, "All-Optical Packet Header Recognition and Switching in a Reconfigurable Network Using Fiber Bragg Gratings for Time-to-Wavelength Mapping and Decoding," Proceedings of OFC '99, San Diego, Feb. 1999.

W. Shieh, E. Park and A. Willner, "Demonstration of Output-Port Contention Resolution in a WDM Switching Node Based on All-Optical Wavelength Shifting and Subcarrier-Multiplexed Routing Control Headers," IEEE Photonics Tech. Letter, vol. 9, pp. 1023-1025, 1997.

W. Zaumen and J. Garcia-Luna-Aceves, "Dynamics of Link-state and Loop-free Distance-vector Routing Algorithms," Internetworking: Res. Exper.; vol. 3, pp. 161-188, 1992.

W. Hung, K. Chan, L. Chen, C. Chan and F. Tong, "A Routing Loop Control Scheme in Optical Layer for Optical Packet Networks," OFC 2002, paper ThGG111, 2002.

M. Cardakli, D. Gurkan, S. Havstad, and A. Willner, "Variable-bit-rate header recognition for reconfigurable networks using tunable fiber-Bragg-gratings as optical correlators," OFC 2000, paper TuN2, 2000.

K. R. Parameswaran, R. Route, J. Kurz, R. Roussev, and M. Fejer "Highly efficient second-harmonic generation in buried waveguides formed by annealed and reverse proton exchange in periodically poled lithium niobate," LEQS 2001, paper ThL3, Oct. 2001.

M. Cardakli, A. Sahin, O. Adamczyk, and A. Willner, "Wavelength Conversion of Subcarrier Channels Using Difference Frequency Generation in a PPLN Waveguide," PTL, vol. 14, No. 9, Sep. 2002.

IEEE Computer Communications Workshop—Schedule; Program, Oct. 2001.

IEEE Computer Communications Workshop—Abstracts, Oct. 2001.

* cited by examiner

OPTICALLY BOOSTED ROUTER

CROSS REFERENCE TO RELATED APPLICATIONS

This application claims the benefit of the priority of U.S. Provisional Application Ser. No. 60/334,673, filed Nov. 15, 2001 and entitled "METHOD TO FORWARD INTERNET PACKETS WITHOUT CONVERSION FROM AN OPTICAL TO AN ELECTRONIC FORMAT".

STATEMENT AS TO FEDERALLY SPONSORED RESEARCH

The invention described herein was made in the performance of work under Defense Advanced Research Projects Agency (DARPA) contract #MDA972-99-C-0022, and is subject to the provisions of Public Law 96-517 (35 U.S.C. 202) in which the contractor has elected to retain title.

BACKGROUND

The present application describes systems and techniques relating to handling packets defined by optical signals in a machine network.

A machine network is a collection of nodes coupled together with wired and/or wireless communication links, such as coax cable, fiber optics and radio frequency bands. A machine network may be a single network or a collection of networks (e.g., an internetwork, such as the Internet), and may use multiple networking protocols, including internetworking protocols (e.g., Internet Protocol (IP)). These protocols define the manner in which information is prepared for transmission through the network, and typically involve breaking data into segments generically known as packets (e.g., IP packets, ATM (Asynchronous Transfer Mode) cells) for transmission. A node may be any machine capable of communicating with other nodes over the communication links using one or more of the networking protocols.

The networking protocols are typically organized by a network architecture having multiple layers, where each layer provides communication services to the layer above it. A layered network architecture is commonly referred to as a protocol stack or network stack, where each layer of the stack has one or more protocols that provide specific services. The protocols may include shared-line protocols such as in Ethernet networks, connection-oriented switching protocols such as in ATM networks, and/or connectionless packet-switched protocols such as in IP.

Typically, many of the sub-networks in a network are wire-based electronic networks. But for long-haul connections, the networks being used are increasingly fiber-based optical networks (e.g., SONET and Synchronous Digital Hierarchy (SDH) based networks) connected with existing networks. IP routers are currently used in such optical networks. Many such routers receive packets as optical signals, convert them to electronic signals, compare destination addresses to a list of addresses or address prefixes in a forwarding table, modify their headers, send the packets to selected output interfaces, and convert back to optical signals.

In optical networks, wavelength-division multiplexing (WDM) can be used to increase link speeds. Often associated with WDM is the idea of an "all-optical network," which offers ingress-to-egress transport of data without intervening optelectronic conversions, thus promising potential reductions in end-to-end latency and data loss as well as potential improvements in throughput. Some routers have been enhanced by wavelength-selective optical cross-connect switches and label-switching software, which maps flows of IP packets to lightpaths of WDM channels created dynamically between specific packet-forwarding endpoints. Label switching for optical networks is being developed as various standards such as Multiprotocol Label Switching (MPLS), Multiprotocol Lambda Switching (MPXS) and Simple Wavelength Assignment Protocol (SWAP).

In an attempt to overcome the high latency of lightpath establishment typical in optical label switching, optical burst switching (OBS) and Terabit Burst Switching (TBS) have been considered as alternative methods of exploiting WDM. The first of a stream of packets destined for one address can blaze a path through the network by setting up segments of the lightpath as it is being electronically routed, succeeding packets in the stream use this lightpath, and the lightpath is torn down later, either by a packet or implicitly by a time-out.

SUMMARY

The present application includes systems and techniques relating to an optically boosted router. According to an aspect, an optical signal defining a packet of data is received, electronic routing of the optical packet is initiated, and optical routing of the optical packet is initiated. The optical routing involves determining forwarding information based on a routing field in the optical packet, and if optical forwarding is available, terminating the electronic routing of the packet before completion of the electronic routing, and forwarding the optical signal, which defines the packet, based on the determined forwarding information.

Details of one or more embodiments are set forth in the accompanying drawings and the description below. Other features and advantages may be apparent from the description and drawings, and from the claims.

DRAWING DESCRIPTIONS

DETAILED DESCRIPTION

The systems and techniques described here relate to handling packets defined by optical signals in a machine. As used herein, the term "machine network" includes all networks in which a node may send packetized communications to another node, including subnets and inter-networks, such as the Internet.

Figure 1:
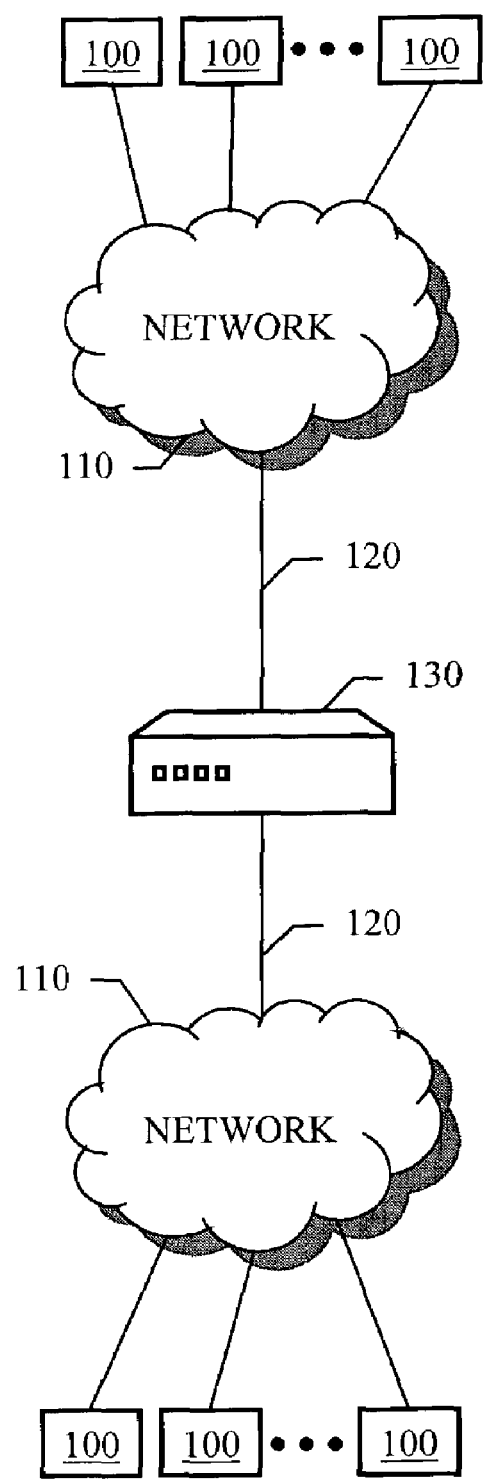
FIG. 1 is a block diagram illustrating an example operational environment for an optically boosted router.

FIG. 1 is a block diagram illustrating an example operational environment for an optically boosted router 130. The optically boosted router (OBR) 130 connects multiple optical links 120. The optical links 120 connect with networks 110, which may use one or more network protocols, such as Ethernet protocol, Internet Protocol (IP), and/or Asynchronous Transfer Mode (ATM). The optical links 120 and the networks 110 provide communication links for multiple network access devices 100. For example, the optical links 120 and the OBR 130 can together form part of a wide-area backbone network composed of IP routers connected by one terabit per second links (e.g., optical fibers).

The optically boosted router 130 may increase the rate at which packets, such as IP packets (e.g., IPv4 packets, IPv6 packets), can be forwarded from an incoming optical interface to an outgoing optical interface. In common network traffic situations, a significant portion of incoming optical packets can be forwarded by the OBR 130 without requiring a full conversion of the optical packets to electronic packets and back to optical packets, while still allowing such electronic-based routing as a backup.

The optically boosted router 130 can minimize optoelectronic conversions, increase the number of packets processed in a given time period, and reduce the time that a packet spends in the router. The optically boosted router 130 can be built as a single device or as a collection of two or more devices. For example, an optical router can be added to an electronic router to create the optically boosted router 130. The optically boosted router 130 can avoid the difficulties associated with MPLS/MPλS and with optical burst switching; in particular, network performance can be improved without requiring contiguous paths of burst-capable or MPLS/MPλS-capable routers.

By implementing an optical router (i.e., an optical booster), using the systems and techniques described, as an add-on component to an existing router, prior investment in existing equipment can be preserved while boosting the overall capacity and performance of the existing router. For example, an optical router can be integrated with a conventional (mostly electronic) Internet router, resulting in an Internet router that may forward packets from a terabits per second link without internal congestion or packet loss. The electronic router (i.e., base router) can be modified to allow for routing-cache updates and packet deletions; the control of the base router is modified to defer to the optical router when transmitting a packet. Such an optically boosted router may be an inexpensive, straightforward upgrade that can be deployed readily in backbone IP networks, and may provide optical processing throughput even when not deployed ubiquitously.

As used herein, both an "optically boosted router" and an "optical router" refer to an optical-packet forwarding device and/or system, and both are referred to as systems below, even though they may be implemented as stand alone devices or combinations of separate devices. Additionally, the term "router" refers to any machine used to selectively forward packetized data on two or more output links.

Figure 2:
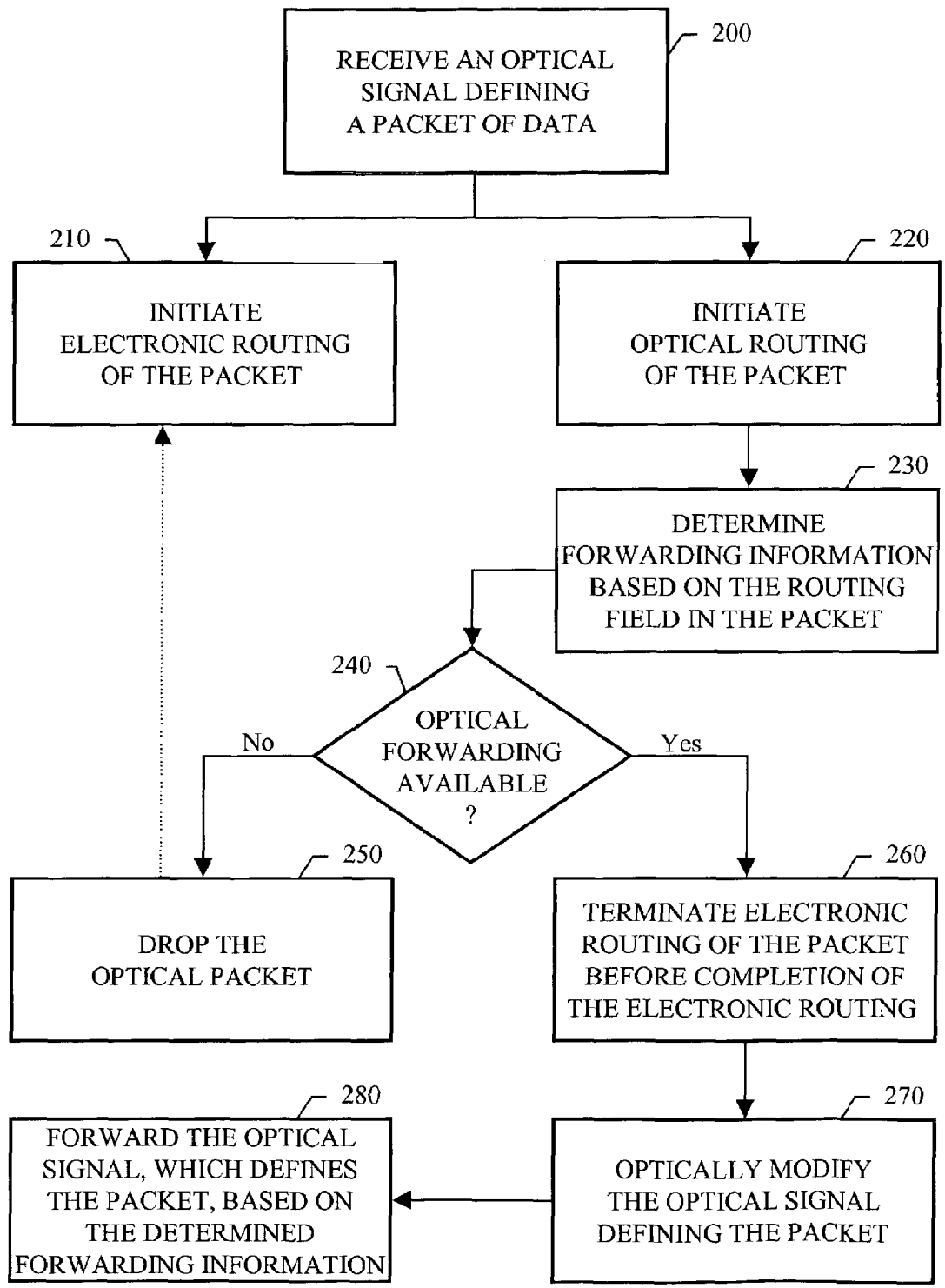
FIG. 2 is a flow chart illustrating example optical packet forwarding in parallel with electronic-based packet forwarding.

FIG. 2 is a flow chart illustrating example optical packet forwarding in parallel with electronic-based packet forwarding. An optical signal defining a packet of data is received at 200. Electronic routing of the packet is initiated at 210. This electronic routing can involve converting the optical signal to an electronic signal, identifying a routing field (e.g., a destination address, part of a destination address) in the packet, and forwarding the packet based on the routing field and a forwarding table. Such forwarding can involve converting the electronic signal into a new optical signal, after any appropriate processing of the packet.

Optical routing of the packet is initiated at 220. This initiation of optical routing occurs contemporaneously with the initiation of electronic routing (e.g., the optical routing and the electronic routing begin effectively in parallel). The optical routing involves determining forwarding information based on the routing field in the packet at 230. Such forwarding information determination can involve generating a second electronic signal, comprising the routing field, from at least a portion of the optical signal, and checking a memory (e.g., a content-addressable memory (CAM)) for the forwarding information.

Alternatively, the determination of forwarding information can be done optically by using an optical processing device without any conversion between optical and electronic signals. One implementation of this optical processing device may include one or more optical correlators. An optical correlator can be an array of mirrors with tunable reflectivities or an array of Fiber Bragg Gratings. A set of tunable optical correlators (e.g., Fiber Bragg Grating Correlators) can be used to recognize routing fields with specified patterns, and these specified patterns can be associated with output ports. Since many routers have only a few output ports (e.g., core Internet routers have three to four optical output ports), popular entries from a forwarding table can be grouped according to output port and used to identify the patterns for tuning the optical correlators. The optical correlators can thus function as a routing cache, determining forwarding information for an optical packet based solely on optical processing of the routing field.

Once the forwarding information is determined, a decision is made as to whether optical forwarding is available at 240. This decision depends upon whether the determined forwarding information indicates an output optical link for forwarding the optical packet (e.g., an entry corresponding to the routing field is found in a CAM) and whether the indicated output optical link is available (e.g., no contention for a specified output optical link).

In addition, the decision of optical forwarding availability can also involve checking multiple output links. For example, the forwarding information can include references to a primary output port and an alternate output port, and optical forwarding is available if either of these ports is available; forwarding the optical signal can then involve selecting the primary output port if available, and selecting the alternate output port if the primary output port is unavailable.

If optical forwarding is not available, the optical packet is dropped at 250; the electronic routing, which was initiated previously, continues. If optical forwarding is available, the initiated electronic routing of the packet is terminated before completion of that electronic routing at 260. The optical signal defining the packet can be optically modified at 270. The optical signal, which defines the modified packet, is forwarded based on the determined forwarding information at 280.

The modification of the optical signal can involve optically changing a field in the packet defined by the optical signal. For example, a field in the packet can be optically replaced, or a time-to-live (TTL) field in the packet (e.g., an IP TTL field) can be optically decremented. The TTL field can be decremented optically by zeroing the least-significant nonzero bit (the TTL needs to decrease by at least one), and optically inverting the trailing bits thereafter in such as way that the final string of x100 . . . 0 of the current TTL field is converted to x001 . . . 1. Additional details regarding optical decrementing of a TTL field are described below in connection with FIGS. 8-11.

Alternatively, the TTL can be used as an index into a memory (e.g., a 256-entry, fast, read-only memory) that stores the hard-wired ones' complement value of k−1 in location k, or copied to electronics and decremented using a conventional approach.

Moreover, a checksum may need to be recomputed electronically (e.g., in IPv4) based on the modified TTL, or the checksum may be ignored. For example, IPv6 omits the header checksum; or the checksum can be calculated later. The checksum field of the IPv4 packet need not be recomputed. Instead, it may be passed along with a special value that signals to a subset of the routers in the routing domain that the checksum is being temporarily ignored and will be recomputed at the domain's egress router. For additional details regarding such deferred update see U.S. Pat. No. 5,826,032 entitled "Method and network interface logic for providing embedded checksums."

Any electronics used in the modification operations may be pipelined and parallelized to accommodate the header arrival rate, and optical bit, byte, or word replacement of header data may be performed.

Thus, a significant portion of incoming optical packets can be forwarded without requiring a full conversion of the optical packets to electronic packets and back to optical packets, while still allowing such electronic-based routing as a backup. Even in the case of electronic processing of the routing field to determine the forwarding information (e.g., conversion of a portion of a copy of the optical packet into an electronic signal and presentation to a CAM), the routing field can still be processed at the line rate of the optics. When a memory device is used as the routing cache in the optical router, this memory can be kept small because the routing cache is not required to be complete; the electronic router is used as a backup, thus false negatives in the optical router are irrelevant. The optical signals can continue flowing optically using a delay element (e.g., a delay loop) while the cache lookup is performed.

Figure 3:
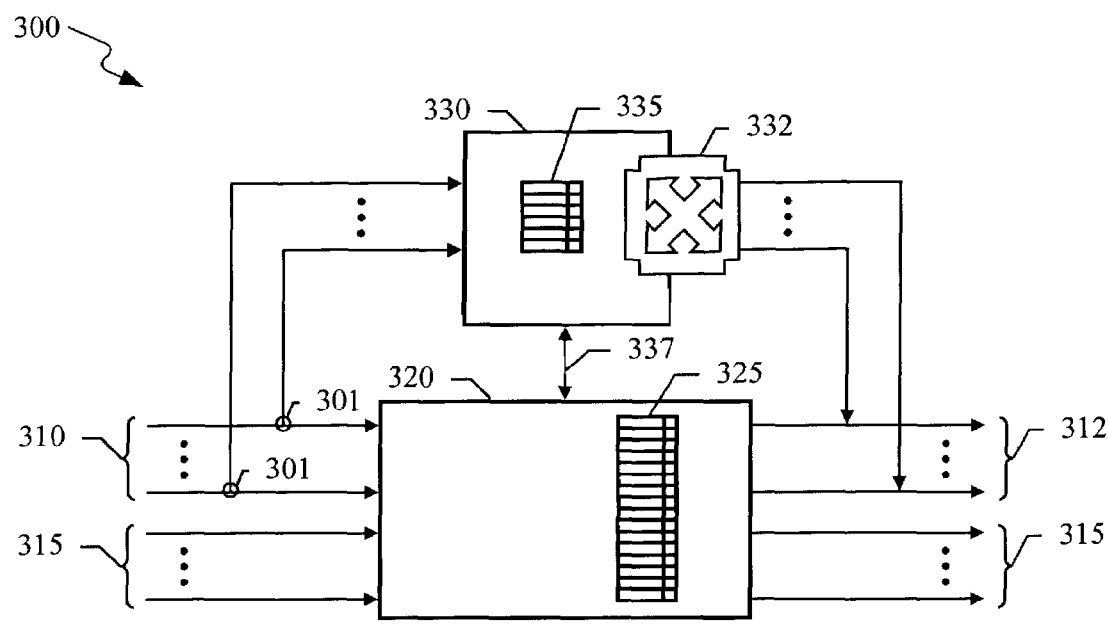
FIG. 3 is a block diagram illustrating an example optically boosted router.

FIG. 3 is a block diagram illustrating an example optically boosted router 300. The OBR 300 includes an electronic router (base router) 320 and an optical router (optical booster) 330. Optical couplers 301 can be connected in the input optical signal paths to split optical inputs for use by the optical router 330 and the electronic router 320, and the optical router 330 and the electronic router 320 can have shared output links and/or ports. The electronic router 320 can include optical components as well, such as one or more optical detectors to convert received optical signals into electronic signals. But in general, the optical router 320 performs its routing operations entirely in the electronic domain (e.g., a conventional router implemented in digital electronics). Thus, optical packets are converted to electronic format so that they can be added to a queue while lookup operations are performed using a forwarding table 325.

The optical router 330 can process packets (e.g., IP packets) analogously to the electronic router, while potentially avoiding the time-consuming lookup function, multiple conversions, queuing, and store and forward delay in the electronic router. Moreover, the packets can be kept entirely in an optical format while forwarding information for the packet is determined. An optical packet can be briefly delayed using an optical delay element while forwarding information is determined using a routing cache 335 of forwarding information. The optical delay element can provide an optical packet delay corresponding to the time necessary to determine whether the optical packet will be forwarded optically, e.g., a forwarding decision time associated with an arbiter, an optical booster, and an optical space switch for a particular design. Despite the brief delay, which is much smaller than the typical packet delay in the electronic router, the optical router 330 can still operate at an optical line rate of terabits per second (Tb/s).

The routing cache 335 can be electronically based, such as a memory (e.g., an associative memory, such as a CAM) storing the forwarding information, or the routing cache 335 can be optically based, such as by using an optical processing device (e.g., one or more optical correlators configured with the forwarding information). Digital logic can be used to read a destination address from an optical packet and submit the address to the routing cache 335. Destination addresses frequently exhibit a high degree of temporal locality, such as is common in IP networks, often achieving hit rates above 90% with modest cache sizes and simple cache-replacement policies. The routing cache 335 enables optical packet forwarding based on forwarding information derived from the forwarding table 325.

Optical packets are provided to both the electronic router 320 and the optical router 330 on one or more optical input links 310 (e.g., the optical packets can be split optically), and the optical packets are forwarded on two or more optical output links 312. The optical links 310, 312 can correspond to separate physical channels (e.g., optical fibers). If the electronic router 320 has multiple high-speed (Tb/s) optical interfaces, the optical router 330 can be inserted into the path of these interfaces. In some implementations, the optical links 310, 312 would all have the same data rate, signal format, and maximum frames size (fragmentation should be avoided). Moreover, the electronic router 320 can also use nonoptical links 315, and only a subset of the electronic router's links may be boosted using the optical router.

The electronic router 320 and the optical router 330 exchange control and routing information. The degree of integration between the electronic router 320 and the optical router 330 can be kept to a minimum, but generally involves a coupling such that the two subsystems can coordinate packet-deletion signals with each other as well as the exchange of forwarding information (e.g., routing-table information). For example, a signaling interface 337 between the optical router 330 and the electronic router 320 can be a simple, fast parallel link that supports a small set of commands, such as "discontinue the processing of the current packet because of cache hit without contention," "continue the processing of the current packet because of cache hit with contention," and "continue the processing of the current packet because of cache miss." Moreover, because the routers 320, 330 share output links and the electronic router 320 defers to the optical router 330 when sending a packet, the optical router 330 can signal to the electronic router 320 when an output link is in use and not in use. Digital logic can be used to decide whether an address is included in the routing cache 335 and whether to notify the base router 320 that an incoming packet with a matching address is to be handled by the optical router 330.

Thus, the optical router can be built as an add-on component to existing electronic routers with minor redesign of router control interfaces for the existing electronic routers. A network may be upgraded router by router, rather than as a whole. A proper subset of router links may be boosted, at the discretion of a network operator, without requiring new protocols or affecting interoperability. Such resulting enhanced routers operate like the existing routers, except that the forwarding speed is increased substantially.

The optical router 330 supports a much higher forwarding rate than the electronic router 320 and incorporates an optical space switch 332 that switches packets among the inlets and outlets of the router 300. When the packets can be different lengths, such as in IP, the switch should be capable of asynchronous operation. If the routing cache hit rate of the incoming packet stream is high, then a large fraction of the input packet stream is offered to this optical switch. Such optically switched packets need not be forwarded by the electronic router 320, and their processing in the electronic router 320 is terminated. Packets that cannot be forwarded by the optical router 330 are dropped, since they are already being handled by the electronic router 320.

Figure 4:
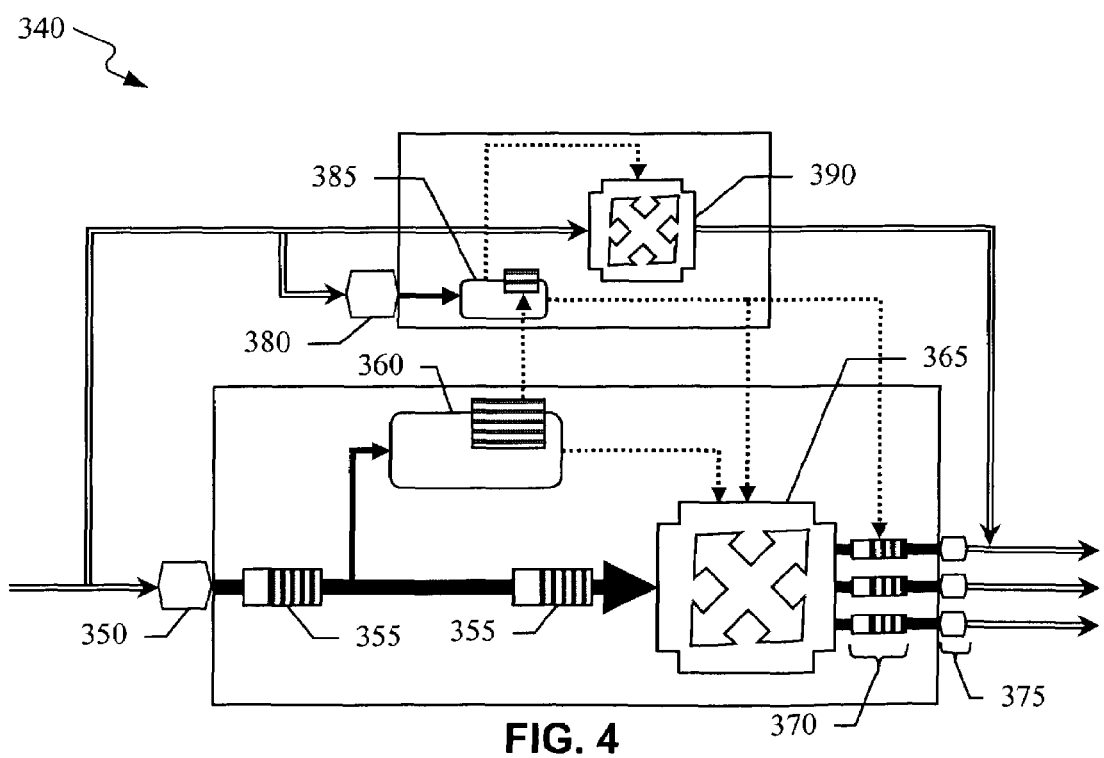
FIG. 4 is a block diagram illustrating example components of an optically boosted router.

FIG. 4 is a block diagram illustrating components of an example optically boosted router 340. An electronic router converts incoming optical packets using an optoelectronic converter 350 and stores the electronic packets in one or more packet buffers 355. A forwarder component 360 performs lookup operations using a forwarding table and controls an electronic switch 365 to direct electronic packets to an appropriate output packet buffer 370. The electronic packets are then converted back to an optical format using optoelectronic converters 375.

An optical router converts at least a portion of incoming optical packets (e.g., a routing field) using an optoelectronic converter 380. A forwarder 385 then determines forwarding information using an associative memory, such as a commodity CAM (e.g., a small CAM having one to eight kilobytes of entries). The associative memory can reproduce entries of the full forwarding table and provides either the identity of the outgoing interface for an optical packet or an indication that forwarding information for the packet is not present in the associative memory.

If forwarding information for the packet is not present in the associative memory, the optical router ignores the packet and allows the electronic router to handle the packet. Moreover, the indication can be an affirmative indication of the lack of forwarding information, which can be used in a forwarding information update scheme for the associative memory.

When the forwarding information is present, the packet can be passed to a nonblocking optical space switch 390 (e.g., a 1×2 lithium niobate (LiNbO₃) device) that attempts delivery to the correct output link. Additionally, the forwarder 385 communicates with the electronic router to terminate its processing of the packet being passed to the nonblocking optical space switch 390, after a lack of contention has been determined. As CAM and optical space switch technology improves, the systems and techniques described should also become more economical. Moreover, memory accesses performed in the optical router can be parallelized and/or pipelined; additional CAMs can be added to allow parallel processing of packets, thereby increasing the throughput of the optical router.

In some implementations, a set of packets may be submitted simultaneously to the switch 390, and in this case, more than one packet might need to be switched to the same outlet. Such contention for outlets can be handled by dropping all but one of the contending optical packets, and allowing the dropped optical packets to be fully processed by the electronic router.

Figure 5:
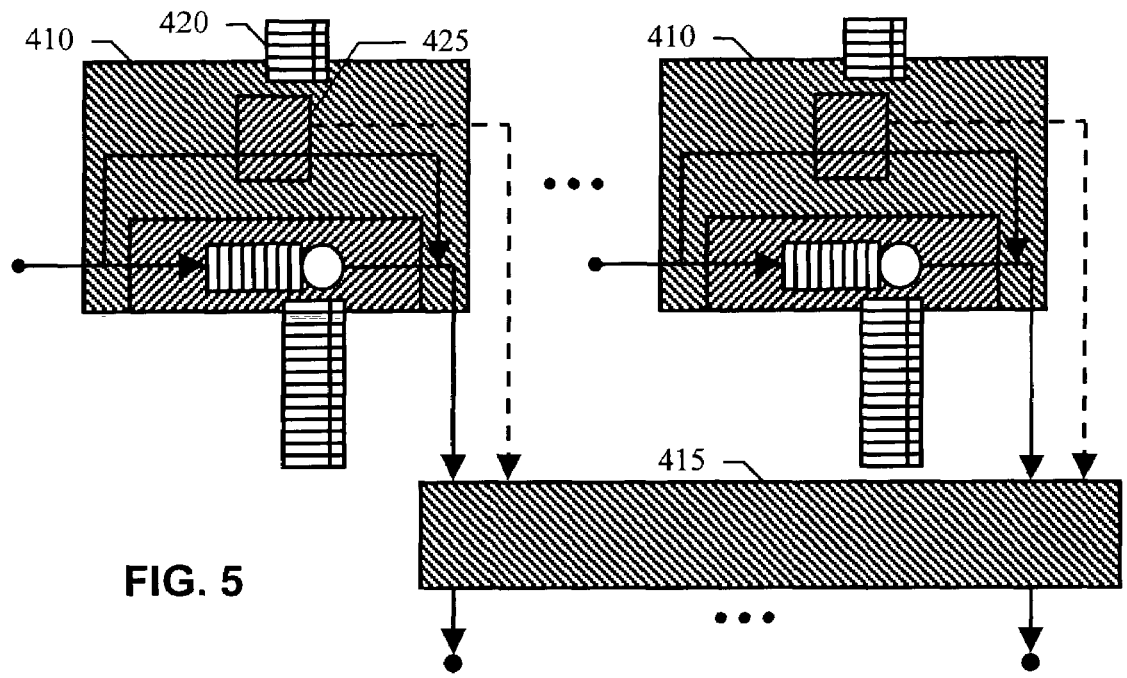
FIG. 5 is a functional block diagram illustrating components of an optically boosted router.

FIG. 5 is a functional block diagram illustrating components of an optically boosted router. Optics are shown in green  electronics are shown in brown  data flow is shown with solid arrows, and control flow is shown with dashed arrows. Router functionality can be distributed among multiple line cards 410 and a switching fabric 415. When a packet arrives on a link, the packet can be replicated physically so that two identical copies are fed in parallel to the electronic and optical subsystems, until one of the copies is dropped or terminated and the other allowed to proceed and be forwarded to a next hop.

For example, a destination IP address can be read by the optical router, latched, and presented to a routing cache 420. Reading the address involves parsing the packet header at line rate to locate the address and converting the address from its native optical format to an electronic format. To enable line-rate parsing, parts of the packet header can be encoded at a lower bit rate than the main portion of the packet. If the sought-after address is not in the routing cache 420, then the optical signal defining the packet can be dropped (i.e., deleted), and the copy of the packet in the electronic router is allowed to proceed through. If the address is found in the routing cache 420, then an arbiter 425 determines whether the desired output is in use or is sought by another input packet. If the arbiter finds no contention, the switch fabric 415 is configured so that the packet's inlet and outlet are physically bridged; the packet is effectively forwarded to its next hop without optoelctronic conversion, and the copy of the packet in the electronic router is terminated. If the arbiter 425 detects contention for the output, then all but one of the contending packets are deleted from the optical router and allowed to survive in the electronic router, where they will be forwarded to their next hop routers. The arbiter 425 should be capable of making the output link availability determination and configuring the optical space switch within the timing constraints of the packet arrivals (e.g., the arbiter may need to operate at a speed of 6.25 GHz).

Figure 6:
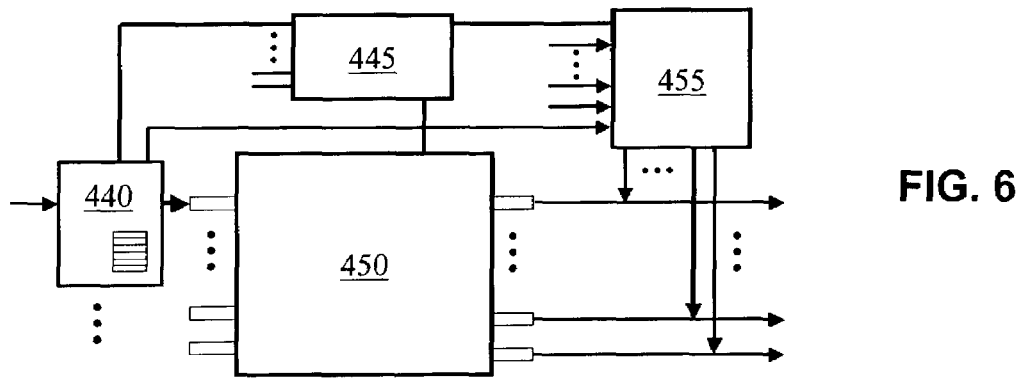
FIG. 6 is a block diagram illustrating components of an example optically boosted router.

FIG. 6 is a block diagram illustrating components of an example optically boosted router. When an electronic router 450 includes multiple high-speed optical interfaces, then the optical router can be inserted into the path of those interfaces as shown. The optical router maintains incoming packets in an entirely optical format using a dual-fabric approach as described, which creates an all-optical channel as well as the base electronic router's default optoelectronic channel. Potentially undesirable side-effects of this approach, such as out-of-order delivery, can be mitigated by simple workarounds, such as by increasing the amount of forwarding information that can be handled by the routing cache.

The optical router can be implemented as multiple components: a booster module 440 for every input interface being boosted, an arbiter 445, and an optical space switch 455. The booster module 440 can include an optoelectronic element capable of reading an IP destination address, a fast memory containing a cache of routes for recently seen destination addresses and a 1×2 lithium niobate (LiNbO₃) optical space switch. The arbiter 445 resolves contention for switch resources. The optical space switch 455 can be an N×N LiNbO₃ switch, where N is the number of links being optically boosted.

Figure 7:
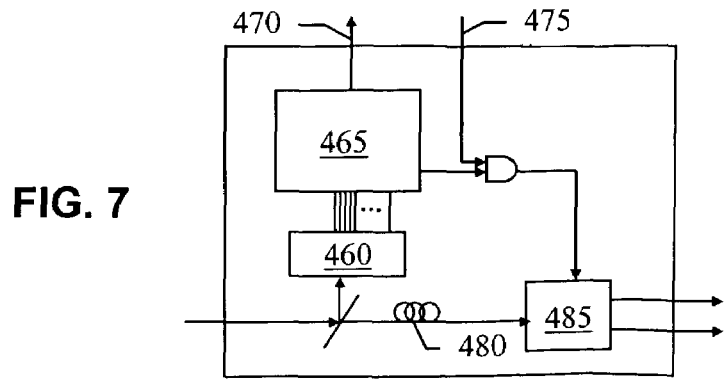
FIG. 7 is a block diagram illustrating components of an example booster module for use in an optically boosted router, such as shown in FIG. 6.

FIG. 7 is a block diagram illustrating components of an example booster module for use in an optically boosted router, such as shown in FIG. 6. When a packet enters the system, the optical signal is split into two copies. One copy passes through an optoelectronic converter 460 while the other passes through an optical delay element 480 (e.g., a distance-based delay element or a materials-based delay element). The optoelectronic converter 460 converts the destination address of the packet to an electronic form, latches it, and presents it to a CAM 465. The CAM 465 looks up the address and returns the identity of the outgoing interface for that address, if it appears in the CAM.

When addresses hit in the CAM, the arbiter is signaled on an output line 470 to determine if the output link is available. If the output link is available (as indicated by the arbiter on input line 475), and if there was a hit in the CAM, then a switching element 485 (e.g., a 1×2 LiNbO$_3$ optical space switch) in the booster module is configured to switch the packet to the main optical space switch. If the output link is unavailable, or if there was a miss in the CAM, then the switching element 485 is configured to drop the packet.

As discussed previously, multiple output links (a primary and an alternate) may be used when an address hits in the routing cache. As traffic increases, output port contention can increase, which can significantly decrease the throughput efficiency of the optically boosted router. Allowing the optical packets contending for the same outlet to choose a second, alternate outlet from the routing cache can reduce contention. These alternate outlets might lead to longer routes than would the primary outlet, but the cost is often less than continuing to send the packet through the base router. A risk of going through the base router, especially under high loads, is that congestion in the buffers will cause packets to be dropped, which carries a high penalty for many protocols (e.g., Internet end-to-end protocols).

The base router can determine both a primary and an alternate route for every address in its routing table and communicate both routes to the routing cache. The process of switching in the optical router then becomes a two-stage event. In the first stage, arriving packets are switched to their outlets. Some packets will have sole access to the outlet and some will contend with other packets for an outlet. Once the arbiter determines exactly which of the contending packets is granted access to the outlet and which of them is to be turned away, the second stage may begin.

Remaining packets are then submitted to their alternate routes. After submission, some of the packets might actually find themselves tentatively switched to those outlets that already have been granted to the successful packets of stage one; these twice-preempted packets are then dropped. The surviving packets are sent to their alternate, open outlets, and some of these packets might experience contention with each other. Such contention is resolved just as in stage one, and those that are preempted in stage two are dropped as well.

The systems described above generally require careful timing analysis during design and fabrication. Accurate and precise timing should be used in choreographing the movement of packets and in coordinating the control actions. In certain implementations, cache lookup and switch control in the optical router should be completed in less than a critical minimum-size-packet time (e.g., 160 ps for IP packets), so that a succeeding packet can be served without competing for these resources. This may be achieved by the use of parallel hardware.

Updating a routing cache in an optical router can be performed using traditional route cache update schemes. For example, the routing cache replacement policy can be a first-in-first-out (FIFO) replacement or a random replacement. In the FIFO scheme, a missed entry is read from the forwarding table into the routing cache such that the oldest entry in the cache is replaced. In the random scheme, the missed entry is placed into a random location of the cache. In general, the routing cache is maintained with the most commonly used forwarding information from the full forwarding table and also corresponding identities of the output links over which packets are to be forwarded. Routing cache updates can be performed as single entry updates (e.g., updates done serially, such as in order of packet arrival) or batch updates (e.g., updates done at regular intervals in batches corresponding to the most-recent missed packets). Additional mechanisms for populating the routing cache may also be used, such as by the use of X/Y classifiers.

Not all of the addresses in the forwarding table will need to be cached. For example, only destination addresses that use an outgoing link to which the optical router is connected may be represented in the routing cache. Multicast addresses and addresses that correspond to the router itself, such as an endpoint of an IP tunnel, can be ignored.

Figure 8:
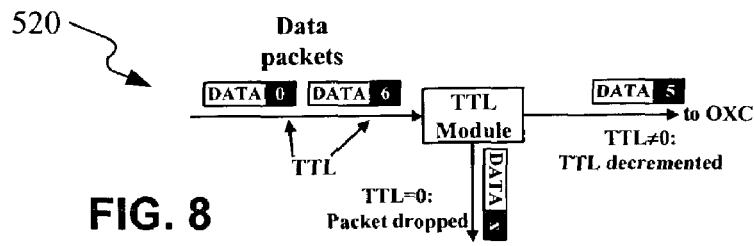
FIG. 8 shows a conceptual diagram of an optical TTL decrement module.

FIG. 8 shows a conceptual diagram of an optical TTL decrement module 520. Packets with TTL fields within the header (not necessarily at the start of the header, but contained within the header with a 1-bit guard time before the TTL to ensure proper timing) enter a switching node and the TTL module. If the TTL value of an incoming packet is nonzero, the module decrements the TTL by one and the packet continues through the switching node. If the TTL of the incoming packet is zero, the packet is dropped.

The binary subtraction process occurs as follows: for any arbitrary starting binary value (e.g., 11010000), subtracting "1" results in each successive bit (from the least-significant-bit to the most-significant-bit (LSB-to-MSB)) being inverted (due to the "borrowing" that takes place during subtraction) until such time as a "1" bit is encountered. As there is no need to "borrow" when subtracting from a "1" bit, no further bits are inverted. Thus the algorithm is simple—once the TTL begins, invert each bit, starting with the LSB, until a "1" bit is encountered. Invert the "1" bit, then stop. This inversion can be done by replacing the data with its conjugate, stopping after the first "1" bit, as shown in FIG. 9.

Figure 9:
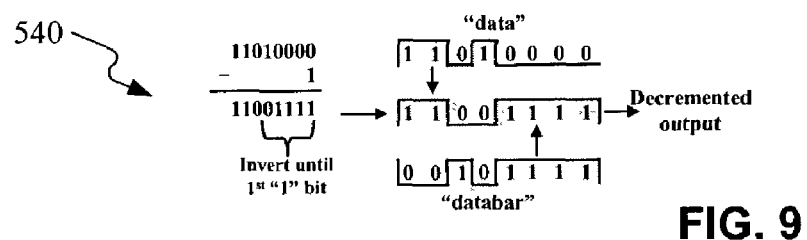
FIG. 9 shows binary subtraction via insertion of conjugate data.
Figure 10:
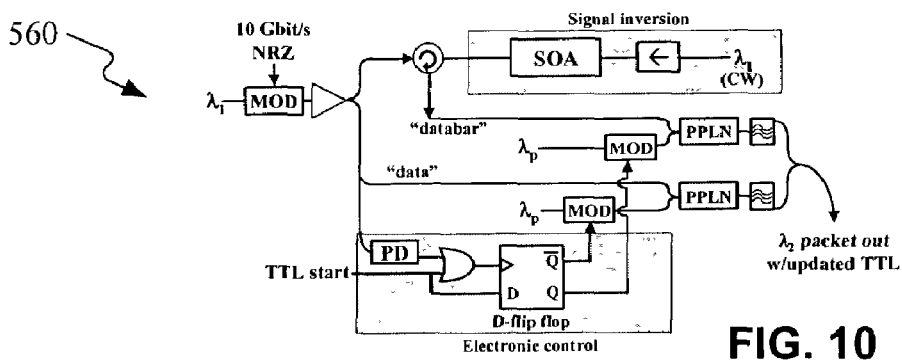
FIG. 10 shows an example setup of an optical TTL decrement module.

FIG. 9 shows binary subtraction 540 via insertion of conjugate data. FIG. 10 shows an example setup of an optical TTL decrement module 560. An incoming data packet, with an 8-bit TTL field, is amplified and split into three branches. The middle branch is the "data" sent to the "data" periodically-poled lithium-niobate (PPLN) waveguide. The top branch is transmitted through a 3-port optical circulator and then through an optical inverter, such as a semiconductor optical amplifier (SOA), to create an inverted copy of the data stream ("databar") via gain saturation with an extinction ratio >10 dB. The bottom branch of the input data stream is sent to a receiver and the resulting signal is used (after an OR gate) as the clock input to a D-flip-flop that selects which of the data streams ("data" or "databar") is used at any given moment by controlling the PPLN waveguide pumps.

Figure 11:
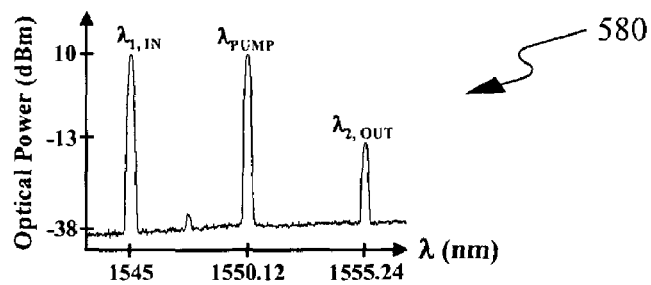
FIG. 11 shows example optical spectrum at the output of periodically-poled lithium-niobate waveguides.

Using a cascaded $\chi^{(2)}$:$\chi^{(2)}$ process, the PPLN waveguides efficiently perform difference-frequency-generation (DFG) and λ-shift an input signal to a new wavelength. By modulating the PPLN waveguide pumps appropriately, an appropriate one of the two PPLN waveguides to be λ-shifting its input signal is controlled. The system uses a single D-flip-flop, where the "Q" output controls the "databar" pump modulator and the "Qbar" output controls the "data" pump modulator, guaranteeing that only one of the two data streams will be λ-shifted at any given time. FIG. 11 shows example optical spectrum 580 at the output of periodically-poled lithium-niobate waveguides. This optical spectrum shows the input, pump, and DFG-generated λ-shifted output. "Databar" is shifted to $\lambda_2$ only when the TTL-modification algorithm requires the conjugate data at the output, and "data" is shifted all other times.

A synchronization pulse, which may be provided using optical preamble detection, signals to the electronics the start of the TTL field and sets the "Q" output of the flip-flop to "1", resulting in "databar" being λ-shifted by the first PPLN waveguide, and shuts off the pump to the "data" PPLN. The first "1" bit in the incoming packet data acts as a "clock" input to the flip-flop, resetting the "Q" output to zero, which shuts off the pump to the "databar" PPLN, beginning k-shifting of the "data" stream to $\lambda_2$.

After filtering out everything save $\lambda_2$, the two synchronized λ-shifted signals are combined by a coupler and the result is a TTL-modified $\lambda_2$ output. The "Q" signal can also be used to control a switch that drops a packet when the TTL is zero. As any "1" bit in the TTL field will cause the "Q" output to reset to "0", a decision circuit can test "Q" immediately after the TTL field has passed. Only if all TTL bits are zero will the "Q" output be high after the TTL has passed. This decision output can be used to reset the flip-flop and drive an optical switch (or other module) that drops the packet. In addition, as any packet with a nonzero TTL will stop shifting "databar" and begin shifting "data" by the end of the TTL field, no guard time between the end of the TTL and the rest of the packet is required.

Thus, the example optical TTL decrementing module can act upon a standard NRZ-modulated 8-bit binary TTL field and can use gain saturation in a SOA and DFG in a PPLN waveguide to perform the TTL decrementing function. If the TTL value on entering the module is "0", the packet is dropped from the network, else the TTL field is decremented by one and passes through. This technique is independent of the TTL length, does not require the use of ultrashort optical pulses, requires no guard time between the end of the TTL field and the packet data, has >10 dB extinction ratio, works for both NRZ and RZ data, has only a 2.4 dB power penalty, and using a decision circuit can generate a signal that drops a zero TTL packet.

The optically boosted router described above increases throughput by sending some of the base router's incoming packets through a low-latency optical booster capable of forwarding at very high speed. A certain portion of the incoming packets are not able to pass through the booster, because either their destination addresses are not in the fast-lookup routing cache or they experience contention at an outlet of the optical switch. Thus, cache hit rate and output-port-contention probability are important factors in determining performance. The hit rate is determined by the traffic characteristics, the routing cache size, and the replacement policy for newly accessed addresses. The contention probability is influenced by the switch size and structure.

With appropriate implementation for a given network, the optically boosted router can push most packets through its optical component without any electronic encumbrance, and do this for a high percentage of packets, while the electronic routing is maintained as a backup. This hybrid, or dual-fabric approach creates an all-optical (or at least effectively all-optical) channel to complement the base router's default optoelectronic channel. By diverting a substantial fraction of packets away from the default optoelectronic channel and onto the all-optical channel, overall throughput and latency are enhanced.

The logic flows depicted in FIG. 2 does not require the particular order shown, or sequential order, to achieve desirable results. In certain implementations, parallel processing may be preferable. Other embodiments may be within the scope of the following claims.

What is claimed is:

1. A system comprising:
   a base router having a forwarding table and being coupled with optical links in a connectionless packet-switched network;
   an optical packet forwarding booster coupled with an input optical link of the base router such that the optical booster processes an optical packet at a line rate of the input optical link contemporaneously with the base router processing the optical packet, the optical booster including a routing cache of forwarding information derived from the forwarding table;
   an optical space switch coupled with the optical booster such that the optical space switch switches optical packets among the optical links of the base router; and
   a signaling interface coupled between the base router and the optical booster such that processing of the optical packet in the base router is terminated when an indication that the optical packet is being forwarded by the optical booster is received by the base router.

2. The system of claim 1, further comprising an arbiter coupled with the optical booster, the optical space switch and with the signaling interface, to resolve contention for output optical links.

3. The system of claim 2, wherein the optical booster further comprises an optical delay element providing an optical packet delay corresponding to a forwarding decision time associated with the arbiter, the optical booster, and the optical space switch.

4. The system of claim 3, wherein the optical booster further comprises digital logic to read an address in the optical packet and submit at least a portion of the address to the routing cache.

5. The system of claim 4, wherein the routing cache comprises a content-addressable memory.

6. The system of claim 3, wherein the optical space switch comprises a nonblocking, asynchronous optical space switch.

7. The system of claim 3, wherein the connectionless packet-switched network comprises an Internet Protocol network.

8. A method comprising:
   receiving an optical signal defining a packet of data;
   duplicating the packet in the optical signal;
   initiating electronic routing of the packet, the electronic routing comprising converting the optical signal to an electronic signal, identifying a routing field in the packet, and forwarding the packet based on the routing field and a forwarding table; and
   initiating optical routing of the packet, the optical routing comprising determining forwarding information based on the routing field in the packet, and if optical forwarding is available,
      terminating the electronic routing of the packet before completion of the electronic routing, and
      forwarding the optical signal, which defines the packet, based on the determined forwarding information.

9. The method of claim 8, wherein determining forwarding information comprises:
   generating a second electronic signal, comprising the routing field, from at least a portion of the optical signal; and
   checking a memory for the forwarding information.

10. The method of claim 8, further comprising, if the forwarding information indicates availability of optical forwarding, optically modifying the optical signal defining the packet before forwarding the optical signal.

11. The method of claim 10, wherein optically modifying the optical signal defining the packet comprises optically decrementing a time-to-live field in the packet.

12. The method of claim 10, wherein optically modifying the optical signal defining the packet comprises optically replacing a field in the packet.

13. The method of claim 8, wherein the forwarding information comprises references to a primary output port and an alternate output port, and wherein forwarding the optical signal comprises:
  selecting the primary output port if available; and
  selecting the alternate output port if the primary output port is unavailable.

14. A method comprising:
  inserting an optical router into paths of multiple high-speed optical interfaces of an electronic router; and
  coupling the optical router with the electronic router such that the electronic router processes an optical packet in parallel with the optical router and functions as a backup forwarding device for the optical router;
  wherein the electronic router processes a converted duplicate of the optical packet processed by the optical router.

15. The method of claim 14, wherein coupling the optical router with the electronic router further comprises coupling the optical router with the electronic router such that the electronic router provides routing cache updates to the optical router, and terminates processing of an optical packet when an indication that the optical packet is being forward by the optical router is received.

16. The method of claim 14, wherein the converted duplicate of the optical packet comes from an optically split optical signal.

17. The method of claim 8, wherein duplicating the packet comprises optically splitting the optical signal.

* * * * *